SEWING MACHINE

Original Filed Oct. 12, 1944 7 Sheets-Sheet 1

INVENTORS
HAROLD J. LE VESCONTE
BY ALBERT M. SCHWEDA
H. C. Dieterich
ATTORNEY

May 2, 1950 H. J. LE VESCONTE ET AL Re. 23,224

SEWING MACHINE

Original Filed Oct. 12, 1944 7 Sheets-Sheet 2

INVENTORS
HAROLD J. LE VESCONTE
BY ALBERT M. SCHWEDA
H. C. Dieserud
ATTORNEY

SEWING MACHINE

Original Filed Oct. 12, 1944 7 Sheets-Sheet 3

INVENTORS
HAROLD J. LE VESCONTE
BY ALBERT M. SCHWEDA
H. C. Dieserud
ATTORNEY

SEWING MACHINE

Original Filed Oct. 12, 1944 7 Sheets-Sheet 4

INVENTORS
HAROLD J. LE VESCONTE
BY ALBERT M. SCHWEDA
H. C. Dieserud
ATTORNEY

SEWING MACHINE

Original Filed Oct. 12, 1944 7 Sheets-Sheet 5

INVENTORS
HAROLD J. LE VESCONTE
BY ALBERT M. SCHWEDA
H. C. Dieterich
ATTORNEY

SEWING MACHINE

Original Filed Oct. 12, 1944 7 Sheets-Sheet 6

INVENTORS
HAROLD J. LE VESCONTE
BY ALBERT M. SCHWEDA
H. C. Dressend
ATTORNEY

SEWING MACHINE

Original Filed Oct. 12, 1944 7 Sheets-Sheet 7

INVENTORS
HAROLD J. LE VESCONTE
BY ALBERT M. SCHWEDA
H. C. Klissen
ATTORNEY

Reissued May 2, 1950 Re. 23,224

UNITED STATES PATENT OFFICE 23,224

SEWING MACHINE

Harold J. Le Vesconte, Glendale, Calif., and Albert M. Schweda, Chicago, Ill., assignors to Union Special Machine Company, Chicago, Ill., a corporation of Illinois Original No. 2,444,657, dated July 6, 1948, Serial No. 558,322, October 12, 1944. Application for reissue May 26, 1949, Serial No. 95,567

25 Claims. (Cl. 112—16)

Matter enclosed in heavy brackets [ ] appears in the original patent but forms no part of this reissue specification; matter printed in italics indicates the additions made by reissue

This invention relates to a sewing machine and more particularly to an improved sewing machine of the type having feed wheels rotatable about substantially parallel axes for supporting and feeding fabrics to the stitch-forming mechanism and generally known as a cup-feed sewing machine.

An object of the invention is to provide a machine of the above type wherein the main drive shaft and the principal actuating mechanism for the feed wheels are positioned above the feed wheels and are so arranged as not to hinder or in any way obstruct the operator in the manipulation and handling of the fabric or fabrics being stitched.

Another object of the invention is to provide a cup-feed type of sewing machine with a suitable and simple actuating mechanism including a vertically disposed main shaft and enclosed devices coupled to and operated by the main shaft for imparting rotational movement to the feed wheels. The disposition of the main drive shaft vertically or parallel with the axes of the feed cups serves to simplify the connection with a motor or other suitable source of power.

Another object of the invention is to provide a sewing machine of the character indicated above wherein the relative position of the outer feed wheel and the loop-taker of the stitch-forming mechanism is maintained under various operating conditions, such as different thicknesses of the work.

Another object of the invention is to provide a cup-feed type of sewing machine having feed wheels so constructed and arranged that their axes of rotation remain substantially parallel irrespective of variations in thickness of the work being sewn.

Another object of the invention is the provision of a cup-feed type of sewing machine having a reciprocating thread carrying needle that is adapted to cooperate with a complementary stitch-forming device mounted within one of the wheels.

Another object of the invention is to provide a machine of the above type so constructed as to permit coaxial operation of a thread manipulating element with one of the feed wheels within which it is disposed.

A further object of the invention is the provision of a cup-feed sewing machine of the foregoing type wherein the principal actuating devices are contained and supported in a substantially oil-tight housing.

A still further object of the invention resides in the provision of a lubricating system in which lubricant pumping or distributing means is responsive to movement of one of the feed wheels toward and away from the other for transmitting lubricant to the principal bearing or relatively sliding surfaces of the actuating devices.

With the view of accomplishing the foregoing objects, the sewing machine of this invention comprises a housing consisting of an upstanding base having a laterally extending bracket. The housing may be adjustably supported on a vertical column by means of a suitable clamping and bracket arrangement.

A pair of feed wheels, constituting an outer feed wheel and an inner feed wheel, are attached to and rotatable with a pair of corresponding vertical shafts which are carried by and depend from the housing bracket. The axis of the shaft of the outer feed wheel is fixed, while the axis of the shaft of the inner feed wheel is movable about an axis that is substantially parallel to the axes of both shafts, permitting movement of the inner feed wheel toward and away from the outer feed wheel. Means are provided for normally and yieldingly moving the inner feed wheel toward the outer feed wheel, said feed wheels being maintained a predetermined minimum distance apart. Means, either manual or otherwise operable at will, are also provided for moving the inner feed wheel away from the outer feed wheel against the action of said yielding means. The feed wheels cooperate with a reciprocating thread carrying needle and a looper that is oscillatable about the axis of the outer feed wheel for forming stitches in various fabrics.

The actuating mechanism of this invention includes a vertical main shaft which is coupled to and operates various driving devices supported within the housing. Among the driving devices are suitable eccentrics, linkages, gearing, and a one-way clutch for operating the intermittent feed mechanism, all so constructed and arranged as to actuate the feed wheels, the reciprocating needle and the oscillatory looper in predetermined timed relation to the rotation of the main shaft.

One of the features of this invention resides in the provision of a pumping system responsive to movement of the inner feed wheel, toward and away from the outer feed wheel, for transmitting lubricant to various devices within the housing. The preferred and recommended type of pumping system contemplates a positive displacement pump wholly contained within the housing and having at least a portion thereof disposed in a sump or reservoir formed in the base portion of the housing. Lubricating oil or the like is transmitted by the pump through a discharge conduit and appropriate branch conduits to various mechanical connections within the housing, as will be readily understood from an examination of the drawings.

The above enumerated objects and features, as well as others, together with the advantages attainable by the practice of this invention, will be readily apparent to persons skilled in the art upon reference to the following detailed description, taken in conjunction with the annexed drawings which respectively describe and illustrate a preferred embodiment of the invention and modifications thereof, and wherein.

Figure 1:
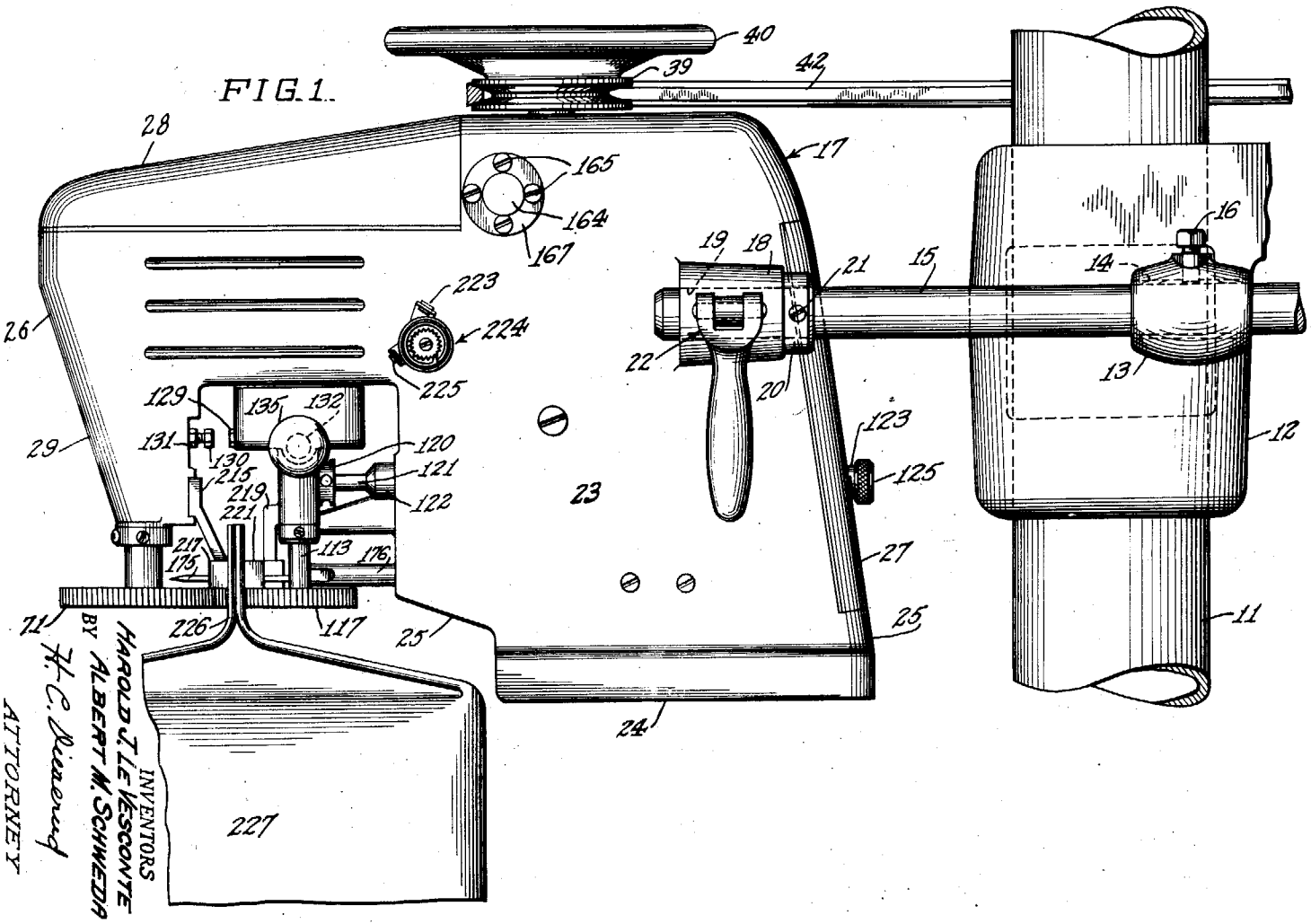
Fig. 1 is a side elevation of a machine embodying the invention.

Referring now to the drawings wherein like reference numerals denote corresponding parts throughout the several views, the sewing machine of this invention is illustrated in Fig. 1 as being supported on a tubular cylindrical column 11 which carries a vertically adjustable bracket sleeve 12 that is provided with a lug 13 having a horizontal bore 14. Bracket sleeve 12 is vertically slidable with respect to column 11 and may be adjustably secured thereto by set screws, not shown, or in any other manner known to the art. A supporting rod or bracket 15 extends through bore 14 in the lug and is secured thereto by means of a set screw 16. The housing of the sewing machine, generally indicated by reference numeral 17, is provided with a lug 18 having a horizontal bore 19 extending therethrough for receiving supporting rod 15. A stop collar 20 is affixed to supporting rod 15 and serves to space housing 17 from column 11. A hand lever 22 is connected to and operates a locking device, the details of which are not shown, for securing lug 18 to rod 15.

Sewing machine housing 17 consists of an upstanding base 23 having a bottom wall 24 and side walls 25, which form an oil sump or reservoir in the bottom of the base, and a laterally projecting overhanging hollow arm or bracket 26. The housing is provided with a readily removable rear cover plate 27 and a top cover plate 28. A bearing support 29 is preferably formed integral with overhanging bracket 26 at its outer end and projects downwardly therefrom.

Figure 2:
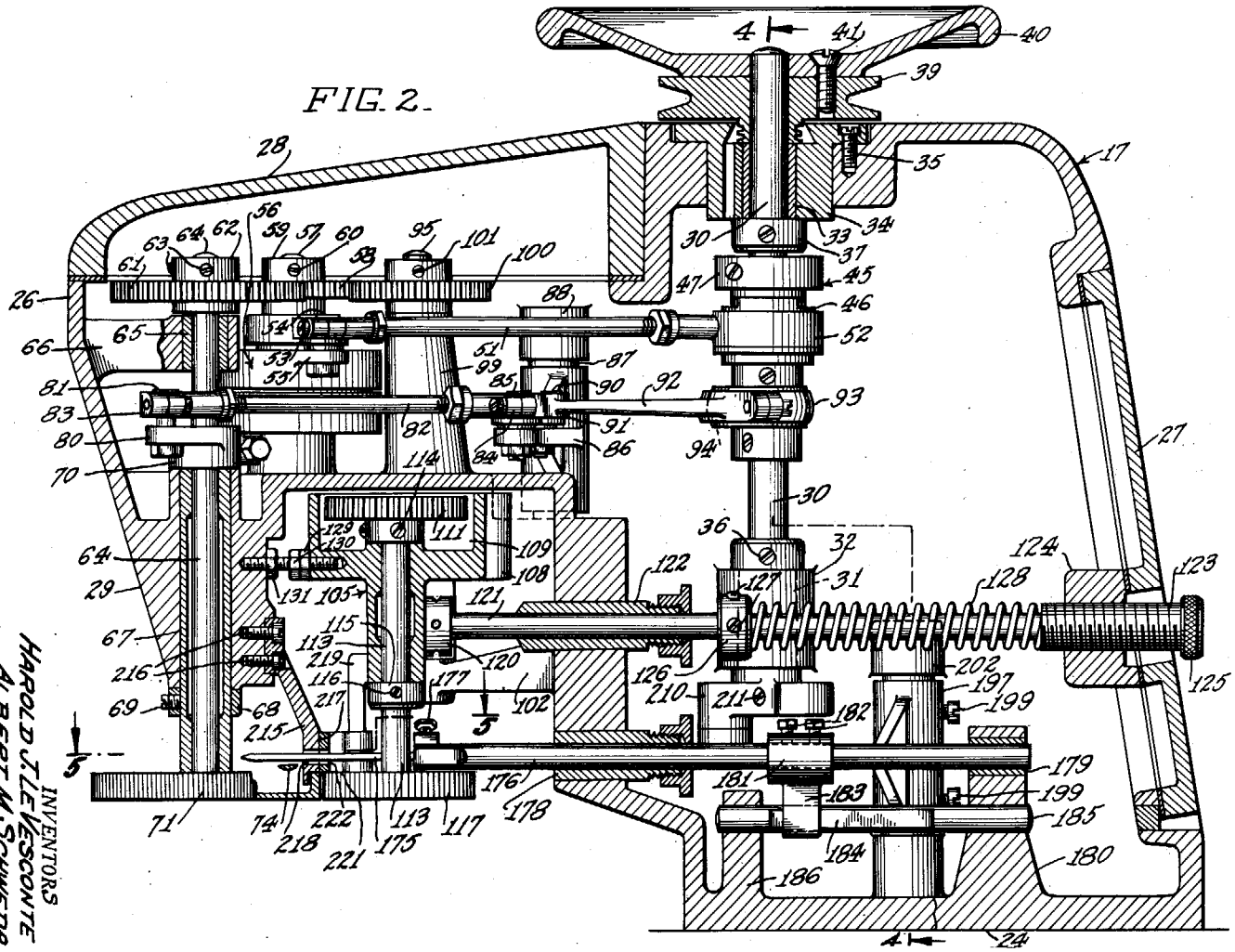
Fig. 2 is a staggered vertical sectional view of the machine of Fig. 1 with parts omitted.
Figure 4:
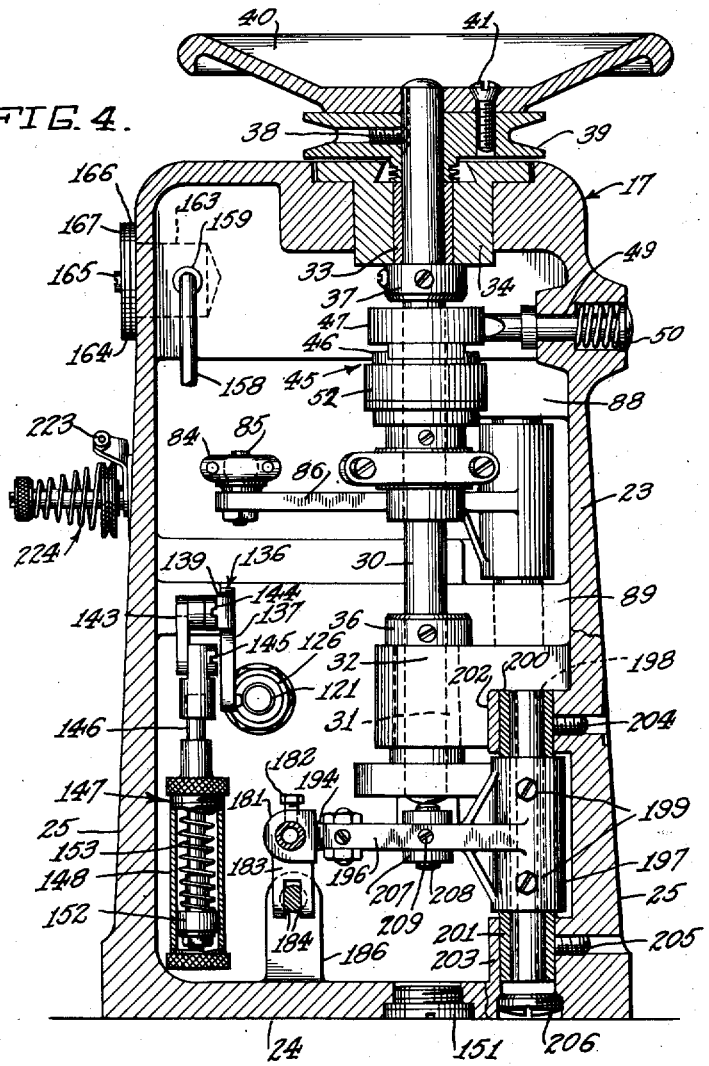
Fig. 4 is a transverse vertical section taken along the broken line 4—4 of Fig. 2.

A substantially vertical main shaft 30 extends through the top of housing 17 and terminates at its upper end above said top and at its lower end within said housing. The lower end of shaft 30 is rotatable in a bearing sleeve or bushing 31 that is supported by a lug 32, while the upper part of the shaft is rotatable in an upper bearing sleeve or bushing 33 that is carried by a removable plug 34 which is secured to the housing by screws 35 (Fig. 2). A pair of collars 36 and 37 secured to shaft 30 and abutting the upper end of sleeve bearing 31 and the lower end of sleeve bearing 33, respectively, restrain the shaft against axial movement. Attached to the upper end of shaft 30 by a set screw 38 is a drive pulley 39 which is secured to a hand wheel 40 by a screw 41 (Fig. 4). A V-belt 42 (Fig. 1) cooperates with drive pulley 39 and delivers power thereto from an appropriate driving unit, not shown, for imparting rotation to main shaft 30.

Figure 3:
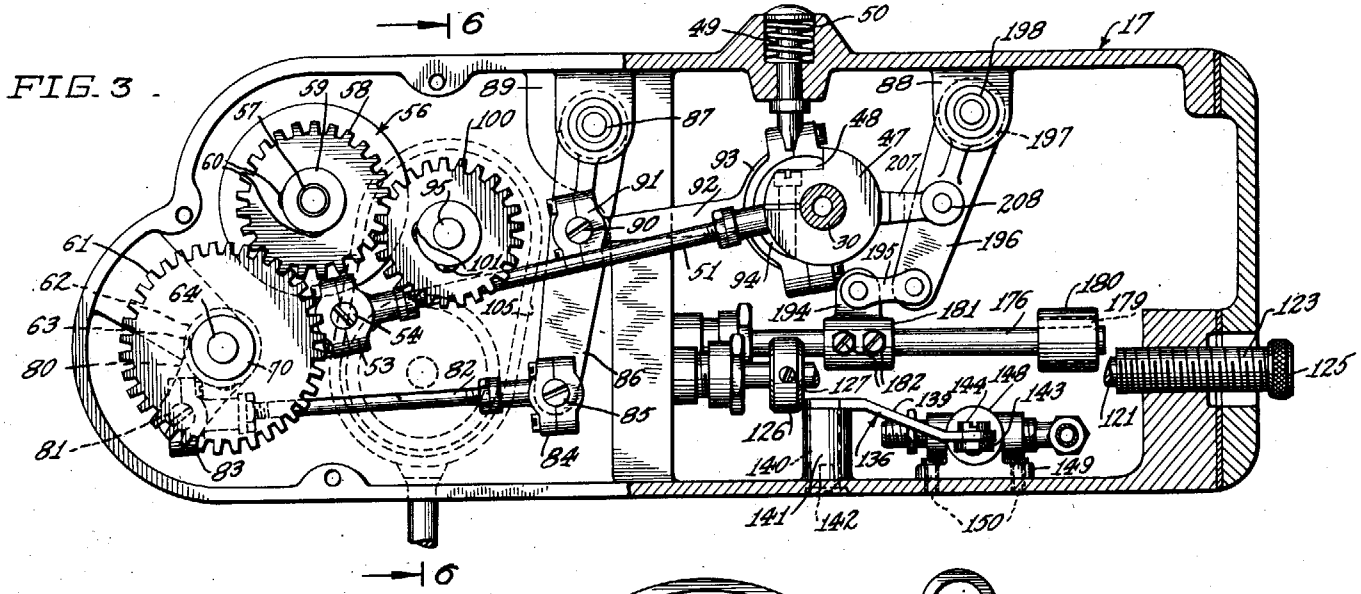
Fig. 3 is a view of the illustrative machine, partly in top plan with the top cover plate removed and partly in horizontal section, certain parts being omitted.

Mounted on shaft 30 and rotatable therewith is an eccentric assembly 45 that may be of the type disclosed in the patent to George Sauer, No. 2,189,656, granted February 6, 1940, and that includes an adjustable eccentric 46, a collar or eccentric operating or adjusting member 47, notched at 48, as best shown in Fig. 3, and a spring pressed plunger 49. When it is desired to adjust eccentric 46, plunger 49 is pressed inwardly against the action of a compression spring 50 and hand wheel 40 is manually actuated to rotate shaft 30 until plunger 49 engages notch 48, whereupon further rotation of the hand wheel and shaft 30 will turn the latter with respect to eccentric 46. This, due to the construction, will shift the eccentric diametrically one way or the other to increase or decrease its eccentricity with respect to the shaft as desired, and as is more fully explained in said Sauer patent. A connecting rod 51, adjustable in length, carries at one end a strap 52 that embraces eccentric 46 and at its opposite end a second strap or split bearing 53 that surrounds a ball stud 54 connected to and projecting upwardly from an arm 55 which extends laterally of a clutch mechanism generally designated by numeral 56. Clutch mechanism 56 is adapted to impart intermittent rotary movement in one direction to a vertical shaft 57 and may be of any type known to the art such as, for example, the type disclosed in the patent to W. B. Long, et al. No. 1,692,130, granted November 20, 1928. It is deemed sufficient for the purposes of this description to point out that upon rotation of main shaft 30, eccentric 46 coacts with the strap of connecting rod 51 to impart oscillatory movement to arm 55, which oscillatory movement is translated into intermittent rotary movement of shaft 57 in one direction by clutch mechanism 56. A driving gear 58 having a hub 59 is secured to the upper end of shaft 57 by one or more set screws 60.

Figure 10:
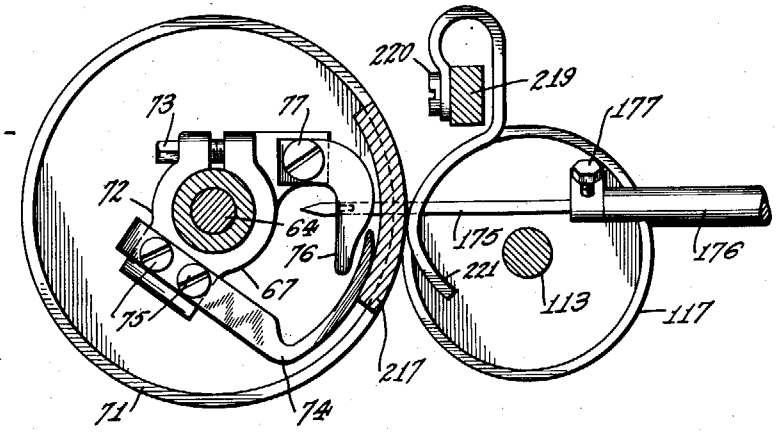
Fig. 10 is a view similar to Fig. 5 but illustrating a presser member in relation to the feed cups.
Figure 5:
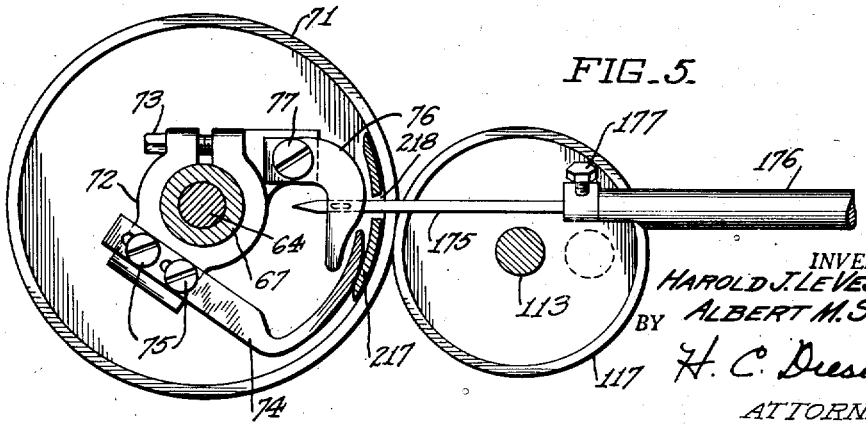
Fig. 5 is a detail view of the feed cups and related parts taken in horizontal section along line 5—5 of Fig. 2.

A driven gear 61 meshing with driving gear 58 and having a corresponding hub 62 is secured by set screws 63 to the upper end of a vertical shaft 64. Shaft 64 is rotatable in a pair of spaced bearings, namely, an upper sleeve or bushing 65 that is carried by a lug 66 projecting laterally within overhanging bracket 26, and a lower sleeve or hollow shaft 67 disposed within and extending below bearing support 29. Sleeve 67 is rotatable within bearing support 29 but is restrained from axial movement by a collar 68, secured thereto by set screws 69 and abutting the lower end of bearing support 29, and by a collar 70 clamped to the upper end of sleeve 67 and abutting the upper end of bearing support 29. Attached to the lower end of shaft 64 is a wheel 71 constituting the outer feed wheel or feed cup of this invention and preferably having its peripheral surface serrated or otherwise roughened. A split collar 72 is connected to the lower end of sleeve 67 by a clamp screw 73, as is best shown in Figs. 5 and 10, and has a looper 74 adjustably attached thereto by set screws 75. A radially adjustable needle guard 76 is also attached to collar 72 by a screw 77.

An arm 80 projecting laterally from collar 70 and integral therewith is provided with an upwardly extending ball stud 81 at its free end. A connecting rod 82, adjustable in length, is provided at one end with a strap 83 that is coupled to ball stud 81 and at its other end with a second strap 84 that is coupled to a ball stud 85 which is carried by a lever 86. One end of lever 86 pivotally embraces a vertical hollow shaft 87 mounted in a pair of inwardly projecting lugs 88 and 89 integral with a wall of housing 17. A ball stud 90 projects upwardly from lever 86 intermediate its ends and is coupled to a strap 91 of a pitman 92 that carries a second strap 93 which embraces an eccentric 94 secured to shaft 30 and rotatable therewith.

From the foregoing, taken in conjunction with Figs. 2 and 3, it will be observed that upon rotation of shaft 30, oscillatory movement is imparted to sleeve 67 and thence to looper 74 and needle guard 76 through the coaction of eccentric 94, pitman 92, ball stud 90, lever 86, ball stud 85, connecting rod 82, ball stud 81, arm 80, and collar 70, in the order named.

Figure 6:
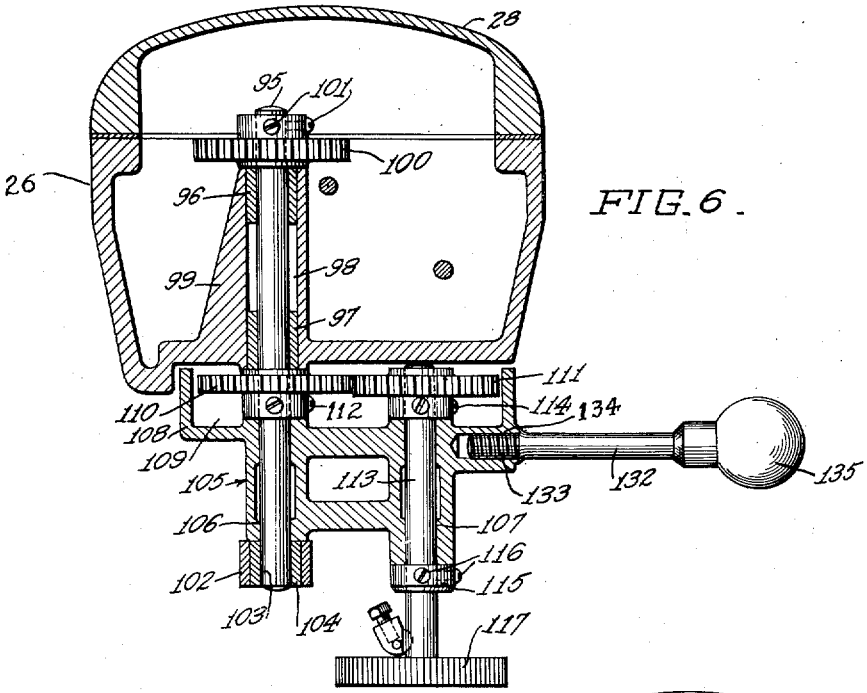
Fig. 6 is a transverse sectional view taken along line 6—6 of Fig. 3.

A shaft 95 parallel to shaft 64 is mounted for rotation in a pair of spaced bearing sleeves 96 and 97 that are located in a bore 98 extending vertically through a lug 99 which projects upwardly from the bottom of frame bracket 26 (Fig. 6). A gear 100 that meshes with gear 58 is attached to the upper end of shaft 95 by set screws 101. A bracket 102 (Figs. 2 and 6) extending outwardly from the vertical portion of housing 17 beneath bracket portion 28 is provided at its free end with a bore 103 that is coaxial with bore 98 in lug 99 and carries a bearing sleeve 104 within which the lower end of shaft 95 is journaled.

A swinging support member generally denoted by numeral 105 is provided with a pair of parallel bores 106 and 107 and a flange portion 108 forming the side wall of a recess 109 for housing meshing gears 110 and 111 which are respectively attached to shaft 95 by set screws 112, and a shaft 113 by corresponding set screws 114. Bore 106 receives a portion of the shaft 95 for rocking movement of the support about this shaft. The support is restrained against axial movement along shaft 95 by bracket 102 and gear 110. A collar 115 is attached to shaft 113 by set screws 116 and cooperates with gear 111 to prevent axial movement of shaft 113 along bore 107. A wheel 117 constituting the second feed wheel or feed cup of this invention is formed integral with or otherwise attached to the lower end of shaft 113 for rotation therewith and preferably has its peripheral surface serrated or otherwise roughened. It will be noted that with the arrangement just described shafts 95 and 113 are both parallel to shaft 64. It will be further noted that member 105 is rotatable about shaft 95 so that inner feed wheel 117 may be swung toward or away from outer feed wheel 71, as desired, to permit the introduction and removal of work and to accommodate different thicknesses of work, the various gears referred to above remaining in meshing engagement, regardless of the relative position of feed wheel 117 with respect to feed wheel 71.

Member 105 is normally and yieldingly urged in a clockwise direction (Fig. 3) about the axis of shaft 95 so that feed wheel 117 is yieldingly maintained in close proximity to feed wheel 71 (Figs. 2, 7 and 9) or in engagement with work between the two feed wheels, by a mechanism that will now be described. This mechanism is best shown in Fig. 2 an includes a stud head 120 that is screwed to one end of a horizontal presser bar 121, slidable through a bearing sleeve 122 in the front wall of the housing and within an externally threaded regulating sleeve 123. Regulating sleeve 123 extends through a tapped lug 124 in the housing and is provided with a knurled adjusting head 125 at its outer end. Presser bar 121 has a collar 126 secured thereto by set screws 127 and carries a concentric compression spring 128 that bears at one end against the collar and at the other end against the inner end of regulating sleeve 123 for normally biasing stud head 120 toward the left as viewed in the drawings. The tension of spring 128 may be varied by adjusting the sleeve 123. A stop screw 129 projects laterally of member 105 and cooperates with an adjustable stop screw 130 projecting laterally of bearing support 29 and having a lock-nut 131. These stop screws serve to adjustably maintain the feed wheels a predetermined minimum distance apart. Feed wheel 117 may be manually moved away from feed wheel 71, against the action of stud head 120, presser bar 121, and compression spring 128, by suitable means such as that shown in Fig. 6. This consists of a rod 132 threaded at one end 133 for connection with a tapped hole 134 in member 105 and having a knob or handgrip 135 at its other end.

Figure 8:
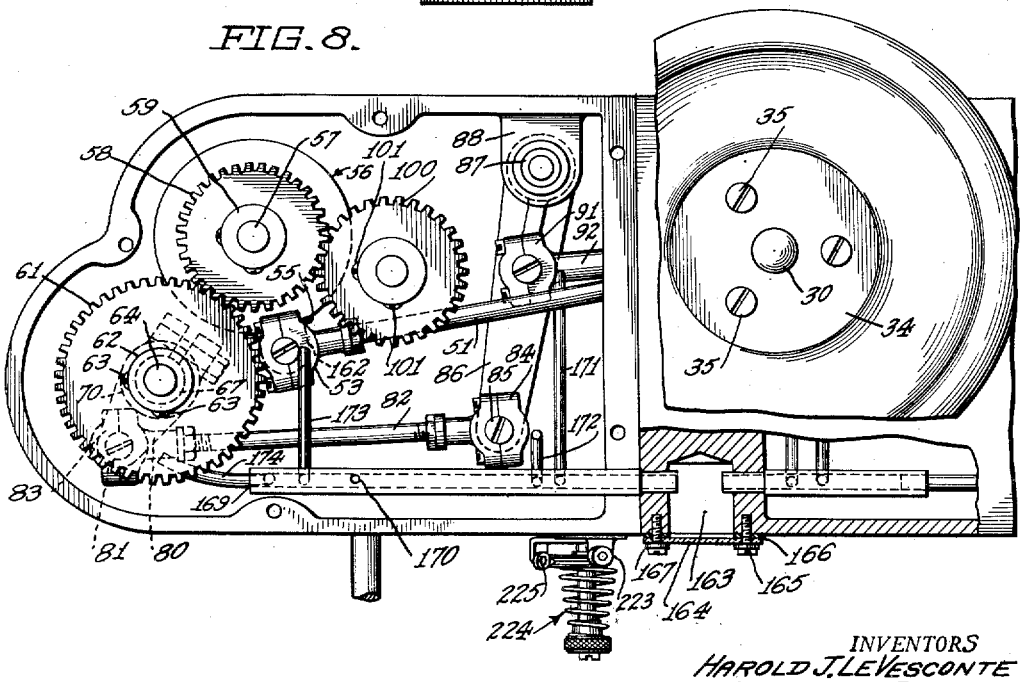
Fig. 8 is a view, partly in top plan and partly in horizontal section, of the illustrative machine, certain parts being broken away or omitted.
Figure 7:
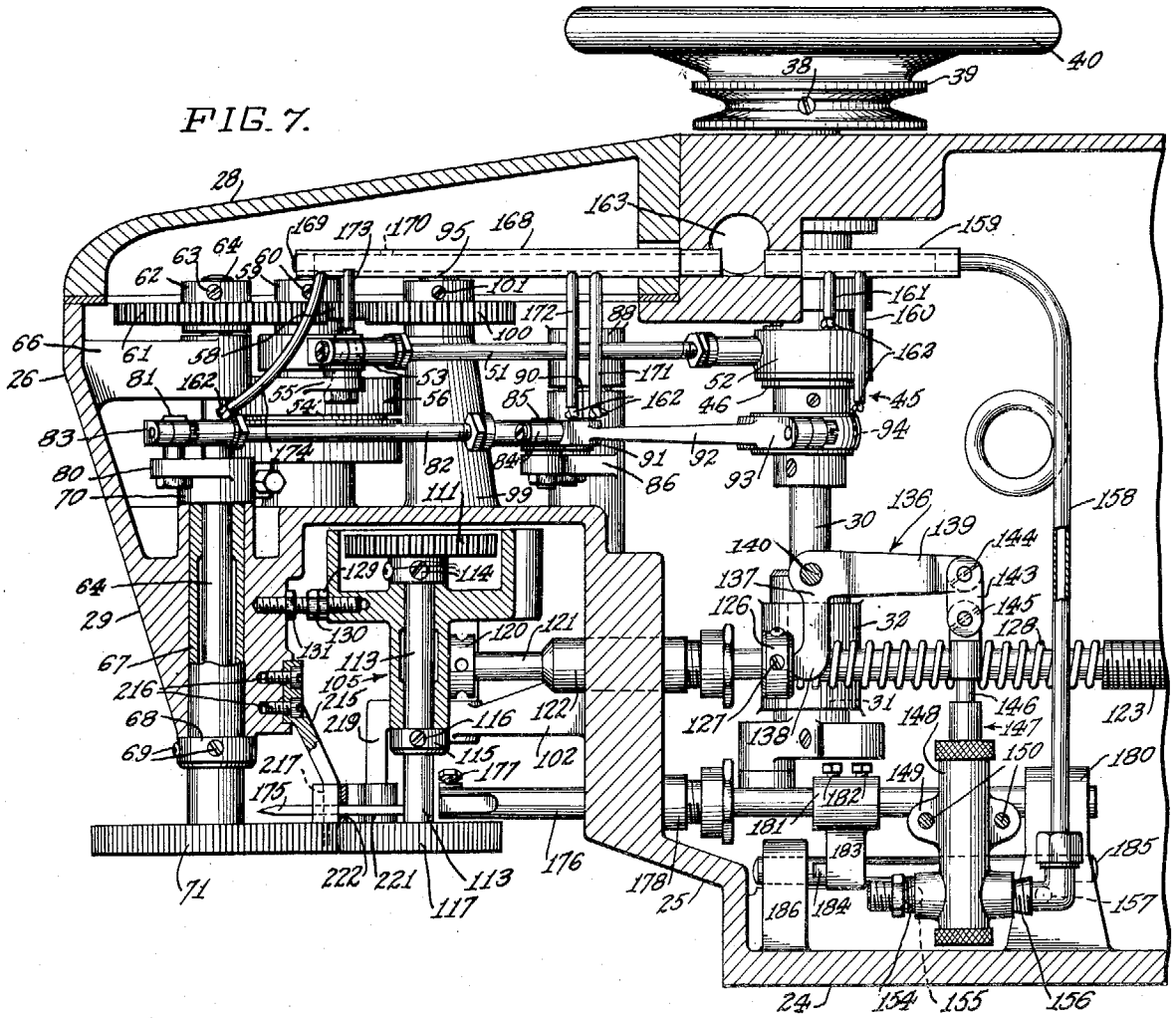
Fig. 7 is a staggered vertical sectional view, similar to Fig. 2 but taken along different planes, illustrating particularly the lubricating system.

It will be observed from an examination of the drawings, that as fabrics are fed between and beyond feed wheels 71 and 117 in the course of stitching the same, variations in thickness of the work, due to seams and the like, will result in movement of feed wheel 117 toward and away from feed wheel 71, and corresponding movement of member 105 about the axis of shaft 95 to effect reciprocation of presser bar 121. Reciprocation of presser bar 121 may also be attained, if desired, by manually actuating member 105 through the medium of handgrip 135 and rod 132. This reciprocation of bar 121 is utilized to actuate a pumping system for lubricating various devices contained within housing 17. To this end, we have provided a bell crank 136 having a vertical leg 137, formed with a foot 138 at its lower end bearing against an end surface of collar 126, and a horizontal leg 139 (Fig. 7). Bell crank 136 is pivotally connected to a pin 140 that is maintained in a hollow lug 141 by a screw 142 (Fig. 3). A connecting link 143 is pivoted to the free end of leg 139 by a screw 144 and is similarly connected by a screw 145 to a piston rod 146 of a reciprocating pump 147 that includes a casing 148 formed with a bracket 149 and that is mounted on a side wall of the machine housing by screw 150 (Fig. 3). Pump 147 is positioned in the lower portion of base 23 which, as was indicated earlier herein, constitutes a sump or reservoir for lubricating oil. Bottom wall 24 of the machine housing is provided with a threaded plug 151 which may be periodically removed for the purpose of draining the oil from the housing. A piston 152 is connected to the lower end of piston rod 146 and is normally biased in a downward direction by a compression spring 153 that is concentric with piston rod 146. The pump is provided with an inlet 154 having a check valve 155 and an outlet 156 having a check valve 157. The pump inlet is preferably maintained below the level of the lubricating oil in housing 17 at all times and the pump is so constructed and arranged that upon upward movement of piston 152, in response to horizontal movement of presser bar 121 toward the right, as viewed in Fig. 7, lubricating oil is admitted into the lower portion of the pump casing. Upon downward movement of piston 152 in response to horizontal movement of presser bar 121 toward the left, and due to the force of compression spring 153, lubricating oil previously admitted into the lower portion of the pump casing is discharged through outlet 156 and past discharge check valve 157 and into a discharge line 158. Lubricating oil so transmitted into discharge line 158 flows into a distribution conduit 159 that is provided with a plurality of branch conduits 160 and 161, each of which contains a suitable wicking material 162 that extends below the free end thereof. These branch conduits serve to lubricate the eccentrics 46 and 94. Distribution conduit 159 also communicates with a horizontal dead end bore 163 which is formed in the casting of housing 17 and which serves as an oil gauge cavity that is provided with a transparent closure assembly consisting of a sight glass 164, mounting screws 165, a gasket 166 composed of an oil resistant material such as a suitable synthetic rubber, and an external bearing ring 167 (Figs. 1, 4 and 8). Also communicating with dead end bore 163 is a second distribution conduit 168 that is provided with a removable plug 169 at its left end and an overflow port 170, as viewed in Figs. 7 and 8. Branch conduits 171, 172, 173 and 174, communicating with and depending from distribution conduit 168, are also provided with wicking material 162 for transmitting oil to ball studs 90, 85, 54 and 81, respectively, whereby these connections are properly lubricated. It will be apparent that distribution conduits 159 and 168 may be provided with additional branch conduits and wicking material for lubricating other connections within housing 17 as required.

The stitch-forming devices of this invention include a needle 175 that is removably and adjustably secured to a reciprocatory tubular needle bar 176 by a set screw 177. Needle bar 176 is slidable through a front bearing sleeve 178 that extends through a side wall of housing 17 and through a rear bearing sleeve 179 that is disposed in an upwardly projecting lug 180. A collar 181 is fastened to needle bar 176, intermediate the sleeves 178 and 179, by a plurality of set screws 182. Collar 181 is formed with a depending bifurcated member 183 which is slidable along parallel planar surfaces 184 of a guide bar 185 that is horizontally supported at opposite ends in the aforementioned lug 180 and a similar lug 186.

Figure 9:
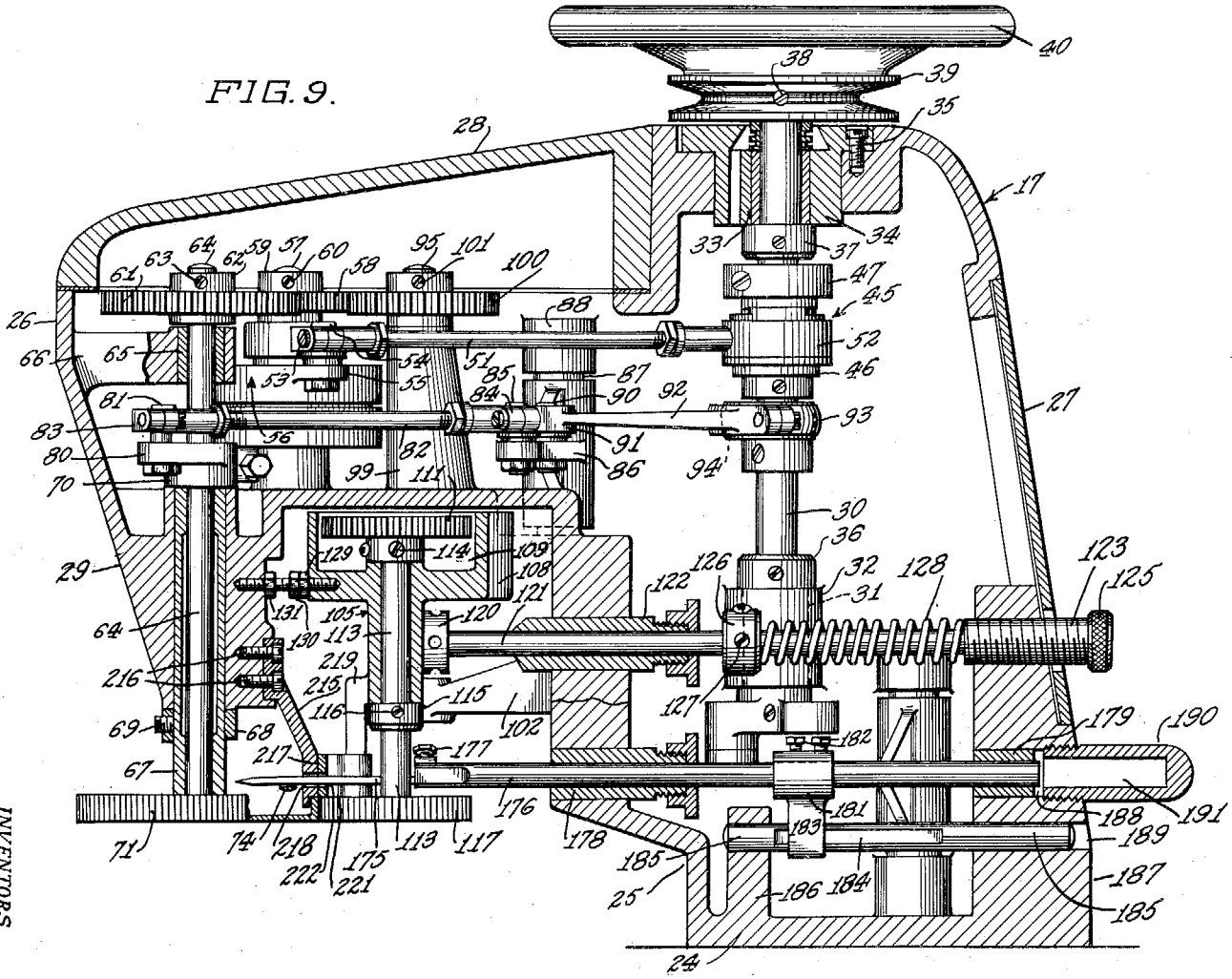
Fig. 9 is a staggered vertical sectional view, similar to Fig. 2, illustrating modifications of certain elements depicted in Fig. 2.

The modification of the machine of this invention illustrated in Fig. 9 is generally similar to that shown in Fig. 2, the difference residing in a slight alteration in the construction of housing 17 and in the elimination of lug 180. It will be observed that side wall 187 of Fig. 9 is bored at 188 to receive the rear bearing sleeve 179 for needle bar 176 and is also bored at 189 to receive and support an end of guide bar 185. A threaded cap 190 is screwed into bore 188 and is provided with a passage 191 that is coaxial with needle bar 176 to receive and protect the end thereof in the course of reciprocation during operation of the machine.

Reciprocation is imparted to collar 181 and therefore to needle bar 176 and needle 175 by devices which will now be described, with particular reference to Figs. 2, 3 and 4. Collar 181 is provided with a laterally projecting arm 194 that is coupled by a link 195 to one end of a lever 196 (Fig. 3) that is formed at its other end with an elongated collar 197 which is secured to a hollow shaft 198 by screws 199 (Fig. 4). Shaft 198 is disposed substantially vertically and is mounted for rotation or rocking movement in a pair of bearing sleeves 200 and 201 that are retained in suitable openings in lugs 202 and 203, respectively, on the frame by corresponding set screws 204 and 205. A removable plug 206 in bottom wall 24 permits of ready access to shaft 198 and bearing 201. A pitman 207 is pivotally connected at one end to lever 196 by a pin 208, which extends through lever 196 and is affixed thereto by a set screw 209, and at its other end to a crank 210 which is secured to the lower end of drive shaft 30 by one or more set screws 211. With this arrangement rotation of main shaft 30 and crank 210 actuates pitman 207 to effect oscillation of lever 196 about hollow shaft 198 and reciprocation of collar 181 and needle bar 176 through the coaction of lever 196, link 195 and arm 194.

A bracket 215, secured to support 29 by screws 216, carries a throat plate 217 that is provided with an aperture 218 for the free passage of the end and shank portion of needle 175. A second bracket 219 is formed preferably integral with member 105, as shown, or, if desired, may be a separate unit rigidly attached to said member. Connected to bracket 219 by screws 220 is a presser foot 221 having a needle passage 222 (Fig. 7) that registers with aperture 218 in throat plate 217 (Fig. 10).

Needle thread, not shown, from a convenient source of supply, also not shown, is threaded through a guide 223, a thread tensioning device 224, a second thread guide 225 (Figs. 1 and 8) and thence through the eye of the needle 175, in the order named. The machine of this invention is adapted to feed and form stitches in various materials for various purposes. It is particularly suited for the stitching of the closure portion 226 of a bag 227 (Fig. 1).

From the foregoing it is believed that the construction, operation and advantages obtainable by the practice of our instant invention will be readily understood by persons skilled in the art. It is to be borne in mind, however, that various changes in the apparatus herein illustrated and described may be resorted to without departing from the spirit of the invention or the scope of the subjoined claims. For example, while a particularly simple and effective stitch-forming mechanism has been provided, in accordance with the invention, other types of such mechanism of known character, including one or more loop takers, might be substituted. A plurality of loopers, adapted to form an overedge type of stitch might be employed in conjunction with the other features of the invention.

We claim:

1. In a sewing machine, a housing comprising an upstanding base and a bracket extending laterally of said base, a feeding mechanism supported by said bracket and including a pair of substantially vertically arranged rotary shafts carried by and depending from said bracket, cooperating feed wheels attached to the lower ends of said shafts, and means for moving one of said shafts and the corresponding feed wheel about an axis that is substantially parallel to the axes of said shafts, and actuating means for the feeding mechanism including a main shaft and devices operated by said main shaft for imparting rotation to the feed wheels.

2. In a sewing machine, a housing comprising an upstanding base and a bracket extending laterally of said base, a feeding mechanism supported by said bracket, and including a pair of substantially vertically arranged rotary shafts carried by and depending from said bracket, cooperating feed wheels attached to the lower ends of said shafts, and means for moving one of said shafts and the corresponding feed wheel about an axis that is substantially parallel to the axes of said shafts, and actuating means for the feeding mechanism including a main shaft substantially parallel to said shafts and having at least a portion thereof disposed within said housing, and devices coupled to and operated by the portion of said main shaft within said housing for imparting rotation to said feed wheels.

3. In a sewing machine, a housing comprising an upstanding base and a bracket extending laterally of said base, a feeding mechanism supported by said bracket and including a pair of substantially vertically arranged rotary shafts carried by and depending from said bracket, cooperating feed wheels attached to the lower ends of said shafts, and means for normally and yieldingly urging one of said shafts in a direction toward the other of said shafts about an axis that is substantially parallel to the axes of said shafts, and actuating means for the feeding mechanism including a main shaft and devices operated by said main shaft for imparting rotation to the feed wheels.

4. In a sewing machine, a housing comprising an upstanding base and a bracket extending laterally of said base, a feeding mechanism supported by said bracket and including a pair of substantially vertically arranged rotary shafts carried by and depending from said bracket, cooperating feed wheels attached to the lower ends of said shafts, and means for normally and yieldingly urging one of said shafts in a direction toward the other of said shafts about an axis that is substantially parallel to the axes of said shafts, means for limiting movement of said one of said shafts toward said other of said shafts to maintain said feed wheels a predetermined minimum distance apart, and actuating means for the feeding mechanism including a main shaft and devices operated by said main shaft for imparting rotation to the feed wheels.

5. In a sewing machine, a housing comprising an upstanding base and a bracket extending laterally of said base, a feeding mechanism supported by said bracket and including a pair of substantially vertically arranged rotary shafts carried by and depending from said bracket, cooperating feed wheels attached to the lower ends of said shafts, and means for normally and yieldingly urging one of said shafts in a direction toward the other of said shafts about an axis that is substantially parallel to the axes of said shafts, means for limiting movement of said one of said shafts toward said other of said shafts to maintain said feed wheels a predetermined minimum distance apart, means for moving said one of said shafts in the opposite direction against the action of said first mentioned means, and actuating means including a rotary main shaft substantially parallel to said shafts, a portion of said main shaft extending through a wall of said housing and terminating therein, and devices within said housing coupled to said main shaft and said feeding mechanism for imparting rotation to said feed wheels upon rotation of said main shaft.

6. In a sewing machine, a housing comprising an upstanding base and a bracket extending laterally of said base, a feeding mechanism supported by said bracket and including substantially vertically arranged rotary shafts carried by and depending from said bracket and cooperating feed wheels attached to the lower ends of said shafts and rotatable therewith, said shafts comprising a first shaft and a second shaft intermediate said first shaft and said base and movable toward and away from said first shaft about an axis that is substantially parallel to the axes of said shafts, cooperating stitch-forming devices located at one side of said base and beneath said bracket and including a reciprocable needle and a looper adapted to engage the needle thread loop and oscillatable in an arcuate path about the axis of one of said shafts, and actuating means including a main shaft and devices operated by said main shaft for imparting rotation to said feed wheels, reciprocatory movement to said needle and oscillatory movement to said looper.

7. In a sewing machine, a housing comprising an upstanding base and a bracket extending laterally of said base, a feeding mechanism supported by said bracket and including substantially vertically arranged rotary shafts carried by and depending from said bracket and cooperating feed wheels attached to the lower ends of said shafts and rotatable therewith, said shafts comprising a first shaft and a second shaft intermediate said first shaft and said base, means for normally and yieldingly urging said second shaft in a direction toward said first shaft about an axis that is substantially parallel to the axes of said shafts, cooperating stitch-forming devices located to one side of said base and beneath said bracket and including a reciprocatory needle and a looper adapted to engage the needle thread loop and oscillatable in an arcuate path about the axis of said first shaft, and actuating means including a main shaft and devices operated by said main shaft for imparting rotation to said feed wheels, reciprocatory movement to said needle and oscillatory movement to said looper.

8. In a sewing machine, a housing comprising an upstanding base and a bracket extending laterally of said base, a feeding mechanism supported by said bracket and including a pair of substantially vertically arranged rotary shafts carried by and depending from said bracket and cooperating feed wheels attached to the lower ends of said shafts, means for normally and yieldingly urging one of said shafts in a direction toward the other of said shafts about an axis that is substantially parallel to the axes of said shafts, cooperating stitch-forming means including a reciprocatory needle and an oscillatory looper coaxial with one of said pair of shafts adapted to engage the needle loop, and actuating means including a main shaft and devices operated by said main shaft for imparting rotation to said feed wheels, reciprocation to said needle, and oscillatory movement to said looper.

9. In a sewing machine, a housing comprising an upstanding base and a bracket extending laterally of said base, a feeding mechanism supported by said bracket and including a pair of substantially vertically arranged rotary shafts carried by and depending from said bracket and cooperating feed wheels attached to the lower ends of said shafts, means for normally and yieldingly urging one of said shafts in a direction toward the other of said shafts about an axis that is substantially parallel to the axes of said shafts, means for limiting movement of said one of said shafts towards said other of said shafts to maintain said feed wheels a predetermined minimum distance apart, cooperating stitch-forming means including a reciprocatory needle and a looper adapted to engage the needle thread loop and oscillatable in an arcuate path and about an axis that is substantially normal to the path of reciprocation of said needle, and actuating means including a main shaft and devices operated by said main shaft for imparting rotation to said feed wheels, reciprocation to said needle, and oscillatory movement to said looper.

10. In a sewing machine, a housing comprising an upstanding base and a bracket extending laterally of said base, a feeding mechanism supported by said bracket and including a pair of substantially vertically arranged rotary shafts carried by and depending from said bracket and cooperating feed wheels attached to the lower ends of said shafts, means for normally and yieldingly urging one of said shafts toward the other of said shafts about an axis that is substantially parallel to the axes of said shafts, cooperating stitch-forming means including a reciprocatory needle and an oscillatory looper adapted to engage the needle loop, and actuating means including a main shaft substantially parallel to said shafts and having at least a portion thereof disposed within the housing and devices coupled to and operated by the portion of said main shaft within said housing for imparting rotation to said feed wheels, reciprocation to said needle, and oscillatory movement to said looper.

11. In a sewing machine, a housing comprising an upstanding base and a bracket extending laterally of said base, a feeding mechanism supported by said bracket and including a pair of substantially vertically arranged rotary shafts carried by and depending from said bracket and cooperating feed wheels attached to the lower ends of said shafts, means for normally and yieldingly urging one of said shafts in a direction toward the other of said shafts about an axis that is substantially parallel to the axes of said shafts, means for limiting movement of said one of said shafts towards said other of said shafts to maintain said feed wheels a predetermined minimum distance apart, cooperating stitch-forming means including a reciprocatory needle and a looper adapted to engage the needle thread loop and oscillatable in an arcuate path and about an axis that is substantially normal to the path of reciprocation of said needle, and actuating means including a main shaft substantially parallel to said shafts and having at least a portion thereof disposed within the housing and devices coupled to and operated by the portion of said main shaft within said housing for imparting rotation to said feed wheels, reciprocation to said needle and oscillatory movement to said looper.

12. In a sewing machine, a housing comprising an upstanding base and a bracket extending laterally of said base, a feeding mechanism supported by said bracket and including a pair of substantially vertically arranged rotary shafts carried by and depending from said bracket and cooperating feed wheels attached to the lower ends of said shafts, one of said shafts being bodily movable toward and away from the other of said shafts, actuating means including a main shaft and devices operated by said main shaft for imparting rotation to said feed wheels, and means responsive to said bodily movement of said one of said shafts for supplying lubricant to said devices.

13. In a sewing machine, a housing comprising an upstanding base and a bracket extending laterally of said base, a feeding mechanism supported by said bracket and including a pair of substantially vertically arranged rotary shafts carried by and depending from said bracket and cooperating feed wheels attached to the lower ends of said shafts, one of said shafts being bodily movable toward and away from the other of said shafts, actuating means including a main shaft substantially parallel to said shafts and having at least a portion thereof disposed within said housing and devices coupled to and operated by the portion of said main shaft within said housing for imparting rotation to said feed wheels, and means responsive to said bodily movement of said one of said shafts for supplying lubricant to said devices.

14. In a sewing machine, a housing comprising an upstanding base and a bracket extending laterally of said base, a feeding mechanism supported by said bracket and including a pair of substantially vertically arranged rotary shafts carried by and depending from said bracket, cooperating feed wheels attached to the lower ends of said shafts, one of said shafts and its corresponding feed wheel being movable toward and away from the other of said shafts and its corresponding feed wheel about an axis that is substantially parallel to the axes of said shafts, means normally and yieldingly urging said one of said shafts about said axis in a direction toward said other of said shafts, means for moving said one of said shafts in the opposite direction against the action of said means, actuating means including a main shaft and devices operated by said main shaft for imparting rotation to said feed wheels, and positive displacement pump means responsive to movement of said one of said shafts toward and away from said other of said shafts for supplying lubricant to said devices.

15. In a sewing machine, a housing comprising an upstanding base and a bracket extending laterally of said base, a feeding mechanism supported by said bracket and including a pair of substantially vertically arranged rotary shafts carried by and depending from said bracket and cooperating feed wheels attached to the lower ends of said shafts, one of said shafts being bodily movable toward and away from the other of said shafts, cooperating stitch-forming devices located at one side of the base and beneath the bracket and including a reciprocatory needle, and actuating means including a main shaft and devices operated by said main shaft for imparting rotation to said feed wheels and reciprocation to said needle, and pump means responsive to said bodily movement of said one of said shafts for supplying lubricant to said devices.

16. In a sewing machine, a housing comprising an upstanding base and a bracket extending laterally of said base, a feeding mechanism supported by said bracket and including a pair of substantially vertically arranged rotary shafts carried by and depending from said bracket and cooperating feed wheels attached to the lower ends of said shafts, one of said shafts being bodily movable toward and away from the other of said shafts, cooperating stitch-forming devices located at one side of the base and beneath the bracket and including a reciprocatory needle and a looper adapted to engage the needle thread loop and oscillatable in an arcuate path about an axis that is substantially parallel to the axes of said shafts, and actuating means including a main shaft and devices operated by said main shaft for imparting rotation to said feed wheels, reciprocation to said needle and oscillation to said looper, and means responsive to said bodily movement of said one of said shafts for supplying lubricant to said devices.

17. In a sewing machine, a housing comprising an upstanding base and a bracket extending laterally of said base, a feeding mechanism supported by said bracket and including a pair of substantially vertically arranged rotary shafts carried by and depending from said bracket and cooperating feed wheels attached to the lower ends of said shafts, means for moving one of said shafts and its corresponding feed wheel about an axis that is substantially parallel to the axes of said shafts, said means normally and yieldingly urging said one of said shafts in a direction toward said other of said shafts, means for moving said one of said shafts in the opposite direction against the action of said means, cooperating stitch-forming devices located at one side of the base and beneath the bracket and including a needle and a looper adapted to engage the needle thread loop and oscillatable in an arcuate path about an axis that is substantially parallel to the axes of said shafts, actuating means including a main shaft substantially parallel to said shafts and having at least a portion thereof disposed within said housing and devices within said housing and operated by the portion of said main shaft within said housing for imparting rotation to said feed wheels and oscillation to said looper, and positive displacement pump means wholly within said housing and responsive to movement of said one of said shafts toward and away from said other of said shafts for supplying lubricant to said devices.

18. In a sewing machine a hollow frame having a lubricant reservoir therein, stitch-forming devices and operating means therefor carried by said frame, work feeding means adapted to feed work in cooperative relation to said stitch-forming means, said work feeding means comprising a pair of feed wheels and operating means therefor, said feed wheels being relatively movable toward and from each other, a pump for distributing lubricant from said reservoir to said operating means, and means responsive to relative movement of said feed wheels toward and from each other for operating said pump.

19. In a sewing machine, a housing comprising an upstanding base and a bracket extending laterally of said base, a feeding mechanism supported by said bracket and including a pair of substantially parallel vertically arranged rotary shafts carried by and depending from said bracket and cooperating feed wheels attached to the lower ends of said shafts and rotatable therewith, one of said shafts being movable toward and away from the other of said shafts about an axis parallel to the axes of said shafts, means for normally and yieldingly urging said one of said shafts toward the other of said shafts, means for moving said one of said shafts away from the other of said shafts against the action of said means, and actuating means for the feeding mechanism, including a main shaft substantially parallel to said shafts, and devices coupled to said main shaft for imparting rotation to said feed wheels.

20. In a sewing machine, a housing comprising an upstanding base and a bracket extending laterally of said base, a feeding mechanism supported by said bracket and including a pair of substantially parallel vertically arranged rotary shafts carried by and depending from said bracket and cooperating feed wheels attached to the lower ends of said shafts and rotatable therewith, said pair of shafts consisting of a first shaft and a second shaft positioned between said first shaft and said base, means for effecting movement of said second shaft and its corresponding feed wheel toward and away from said first shaft and its corresponding feed wheel while maintaining said shafts in parallel relationship, and actuating means including a rotary main shaft substantially parallel to said shafts, a portion of said main shaft extending through a wall of said housing and terminating therein, and devices within said housing coupled to said portion of said main shaft and said feeding mechanism for imparting rotation to said feed wheels upon rotation of said main shaft.

21. In a sewing machine, a housing comprising an upstanding base and a bracket extending laterally of said base, a feeding mechanism supported by said bracket and including a pair of substantially parallel vertically arranged rotary shafts carried by and depending from said bracket and cooperating feed wheels attached to the lower ends of said shafts and rotatable therewith, said pair of shafts consisting of a first shaft and a second shaft positioned between said first shaft and said base, means for normally and yieldingly urging said second shaft in a direction toward said first shaft about an axis that is substantially parallel to the axes of said shafts, means for moving said second shaft in the opposite direction against the action of said means, cooperating stitch-forming devices located at one side of the base and beneath the bracket and including a needle reciprocatory in a plane substantially normal to the axes of said shafts, and actuating means including a main shaft substantially parallel to said shafts, and devices coupled to and operated by said main shaft for imparting rotation to said shafts and reciprocation to said needle.

22. *In a sewing machine a frame having an upstanding portion with a closed bottom and a laterally projecting overhanging bracket, a rotary actuating shaft vertically journalled within said upstanding portion with the upper end thereof extending through said frame and projecting therefrom, a handwheel mounted upon the projecting end of said shaft, a pair of feed shafts mounted on said frame parallel with said actuating shaft, at least one of said feed shafts depending from said overhanging bracket, a pair of cooperating feed-cups carried by said feed-shafts exteriorly of said frame, means operatively connecting said feed-shafts to said actuating shaft for rotation of each thereby in one direction, stitch-forming mechanism including a reciprocatory, horizontally disposed needle-carrying bar, and means disposed within said upstanding portion of the frame for operatively*

*connecting said needle carrying bar to said actuating shaft for actuation thereby.*

*23. In a sewing machine a frame having an upstanding portion with a closed bottom and a laterally projecting overhanging bracket, a rotary actuating shaft vertically journalled within said upstanding portion with the upper end thereof extending through said frame and projecting therefrom, a handwheel mounted upon the projecting end of said shaft, a pair of feed shafts mounted on said frame parallel with said actuating shaft, at least one of said feed shafts depending from said overhanging bracket, a pair of cooperating feed-cups carried by said feed-shafts exteriorly of said frame, means operatively connecting said feed-shafts to said actuating shaft for step-by-step, intermittent rotation of each thereby in one direction, stitch-forming mechanism including a reciprocatory, horizontally disposed needle-carrying bar, and means disposed within said upstanding portion of the frame for operatively connecting said needle carrying bar to said actuating shaft for actuation thereby.*

*24. In a sewing machine a frame having an upstanding portion with a closed bottom and a laterally projecting overhanging bracket, a rotary actuating shaft vertically journalled within said upstanding portion with the upper end thereof extending through said frame and projecting therefrom, a handwheel mounted upon the projecting end of said shaft, a pair of feed shafts mounted on said frame parallel with said actuating shaft, at least one of said feed-shafts depending from said overhanging bracket, a pair of cooperating feed-cups carried by said feed-shafts exteriorly of said frame, said feed cup carried by said one of said feed-shafts being spring urged toward the other of said feed cups but being shiftable away from the latter, means operatively connecting said feed-shafts to said actuating shaft for rotation of each thereby in one direction, stitch-forming mechanism including a reciprocatory, horizontally disposed needle-carrying bar, and means disposed within said upstanding portion of the frame for operatively connecting said needle carrying bar to said actuating shaft for actuation thereby.*

*25. In a sewing machine a frame having an upstanding portion with a closed bottom and a laterally projecting overhanging bracket, a rotary actuating shaft vertically journalled within said upstanding portion with the upper end thereof extending through said frame and projecting therefrom, a handwheel mounted upon the projecting end of said shaft, a pair of feed-shafts mounted on said frame parallel with said actuating shaft, at least one of said feed-shafts depending from said overhanging bracket, a pair of cooperating feed-cups carried by said feed-shafts exteriorly of said frame, means operatively connecting said feed shafts to said actuating shaft for rotation of each thereby in one direction, stitch-forming mechanism including a reciprocatory, horizontally disposed needle-carrying bar and an oscillatory looper, and means disposed at least in part within said upstanding portion of the frame for operatively connecting said needle carrying bar and said looper to said actuating shaft for actuation thereby.*

HAROLD J. LE VESCONTE.
ALBERT M. SCHWEDA.

REFERENCES CITED

The following references are of record in the file of this patent or the original patent:

UNITED STATES PATENTS

| Number | Name | Date |
|---|---|---|
| 180,225 | Gullrandsen et al. | July 25, 1876 |
| 2,043,737 | Christensen | June 9, 1936 |

FOREIGN PATENTS

| Number | Country | Date |
|---|---|---|
| 58,991 | Germany | 1891 |